United States Patent [19]

Leishman et al.

[11] Patent Number: 4,631,760
[45] Date of Patent: Dec. 30, 1986

[54] AUTOMATIC FLUSHING SYSTEM

[76] Inventors: Graham W. Leishman, 12 Hillgrove St., Upper Mt. Gravatt, Brisbane, Queensland; Bruno Minissale, 5 Nielsen Street, Rochedale, Brisbane, Queensland, both of Australia

[21] Appl. No.: 758,276

[22] Filed: Jul. 24, 1985

[51] Int. Cl.⁴ .................. E03D 1/00; E03D 3/00; E03D 5/00
[52] U.S. Cl. ............................ 4/300; 4/313; 4/370; 4/375; 4/405; 4/407
[58] Field of Search ............ 4/321, 322, 323, 324–327, 4/370, 371, 372–377, 379, 405, 407, 408, 300

[56] References Cited

U.S. PATENT DOCUMENTS

| | | | |
|---|---|---|---|
| 370,372 | 9/1887 | Brown | 4/370 |
| 2,741,776 | 4/1956 | Christie et al. | 4/324 |
| 2,883,675 | 4/1959 | Hartman, Jr. | 4/324 |
| 3,320,622 | 5/1967 | Wustner | 4/325 |
| 3,324,482 | 6/1967 | Wustner | 4/325 |
| 3,365,730 | 1/1968 | Chiappetta | 4/325 |
| 3,582,997 | 6/1971 | La Hunt | 4/370 |
| 3,858,250 | 1/1975 | Coglitore | 4/324 |
| 4,000,526 | 1/1977 | Biela et al. | 4/379 |

Primary Examiner—Henry K. Artis
Attorney, Agent, or Firm—Kenyon & Kenyon

[57] ABSTRACT

An automatic flushing system for use with toilets or urinals which includes a tank having a siphon outlet and a hollow float which has a water access port and an air access port. There is also provided support means for supporting the float for generally vertical movement within the tank. There is also provided a tank inlet and tank inlet valve means which is operated by the support means for controlling flow of water through the tank inlet. There is also provided air access port valve means for controlling flow of air into the float. The support means is suitably characterized to enable the float to reach the intermediate holding level which is lower than the maximum level within the tank. The air access port valve means may also control flow of air through the air access port in such a manner as to provide a water seal associated therewith and a gas lock in the hollow float.

There also may be provided remote control means for permitting fluid through the air access port means to break the water seal and consequently the air lock to allow passage of water into the hollow float when required.

17 Claims, 9 Drawing Figures

AUTOMATIC FLUSHING SYSTEM

BACKGROUND OF THE INVENTION

THIS INVENTION relates to an automatic flushing system for use with toilets and urinals.

A conventional automatic flushing system is described in Australian Patent specification No. 522747 and relates to a cistern comprising a tank having a siphon outlet at the base thereof and having an intermediate partition or tray like vessel equipped with a large float valve dividing the tank into upper space and lower space. The partition accommodates the float of a ballcock that admits water directly to the tray. There is provided a valve operated orifice in the tray which opens when the water level in the lower space exceeds a predetermined level. The lower space is in open communication with the siphon outlet which empties the lower space when the predetermined water level is exceeded. The invention is characterized by the provision of a vertical tube which extends through the tray and provides communication between the upper and lower spaces which is adapted to remain filled with water when the lower space has emptied. The upper end of the vertical tube is adapted to extend into the upper space providing a valve seat. There is also provided valve means associated with the valve seat slidably mounted about the upper end of the vertical tube and also remotely operated means for raising or unseating the valve means whereby the valve means remains unseated until the upper space empties into the lower space.

While the flushing system as described in Patent 522747 was satisfactory for normal purposes, it was an essential requirement that it could only be used with cistern tanks having an intermediate partition thereby dividing the cistern tank into upper and lower tanks or upper and lower spaces. It was also considered that the automatic flushing system of Patent 522747 was unduly complicated in construction and operation and therefore was relatively expensive to manufacture or install.

It is therefore an object of the present invention to provide an automatic flushing system that substantially alleviates the abovementioned difficulties associated with the prior art.

SUMMARY OF THE INVENTION

The automatic flushing system of the invention includes the following elements
  a tank having a siphon outlet;
  a hollow float having a water access port and
  an air access port;
  support means supporting said float for generally vertical movement within the tank;
  a tank inlet;
  tank inlet valve means operated by said support means for controlling flow of water through the tank inlet; and
  air access port valve means for controlling flow of air or other fluid into the float.

The tank may have any suitable shape and thus include a base wall, continuous side wall and suitably a top wall. Suitably the tank is cylindrical or cuboidal and in the preferred form may comprise a conventional cistern.

The siphon outlet may be of any appropriate type but suitably includes an outer upstanding pipe having a closed upper end and inlet aperture(s) at a base or lower end. There also may be provided an inner pipe having an open upper end which extends through the base wall of the tank.

The support means preferably includes a float arm or elongate member which is attached to the hollow float at one end and at the other end is attached to a valve member of the tank inlet valve means for controlling flow of water through a valve orifice of the tank inlet valve means.

Preferably and as described in more detail hereinafter the float arm is modified or designed so as to enable the float to reach an intermediate holding level which is lower than the maximum level of water within the tank. In one form the length of the float arm may be such to achieve this end and thus may be shorter in length than a conventional float arm.

The tank inlet may comprise an inlet pipe extending into the interior of the tank and the tank inlet valve means may comprise the conventional cistern valve means or comprise more broadly a valve member movable in the inlet pipe from a closed position shutting off water flow therein to an open position allowing water to enter the tank through the inlet pipe.

The hollow float may also be of any suitable shape and thus may comprise a sphere, cylinder or box like container. The water access port is suitably located in a base or bottom wall of the float and the air or gas access port is suitably located in a top wall of the float or side wall adjacent the top wall.

The air access port valve means may be manually operated, electrically operated, hydraulically operated or pneumatically operated. It however is suitably actuated by remotely controlled means, and thus control or allow the flow of air or other gas into or out of the float to thereby cause water to flow out of or into the float respectively. In one form the valve means may comprise a solenoid valve actuated by an appropriate remotely controlled actuating means such as a sensor or probe. The sensor or probe may be operated by a door or pressure mat or other suitable device or means.

In a preferred form however the float outlet valve means comprises a valve body which communicates with the float in a connection conduit and which is attached to the side wall of the tank or more preferably the siphon outlet. The valve body may be attached to the siphon outlet by a clip of flexible tie or other suitable fastening means.

Preferably the valve body is such as to provide a water seal preventing air from the connection conduit to gain access to atmosphere or the surrounding tank interior. With this objective in mind the valve body may comprise a base chamber having a non return valve and an outlet pipe which extends outwardly from the valve body and a pair of upper chambers each also having a non return valve. One upper chamber may have a hollow connection conduit which is attached to the float and the other upper chamber may have a conduit which is suitably hollow and which is associated with appropriate remote control actuating means.

The operation of the automatic flushing system of the invention may include the following steps:
  (1) The tank may be initially filled or primed with water by suitable operation of the float arm causing the valve member of the tank inlet means to attain an open position. In this step the float may be lying adjacent to or on the base wall of the tank;

(2) Upon reaching its maximum level within the tank the water may also fill the valve body of the air access port valve means through the non-return valve of the base chamber thus creating a water seal and also the float may also be filled with water;

(3) Upon exit of water from the tank by siphon action water may drain from the float allowing air to gain access to the float interior above the water level through the connection conduit via its associated upper chamber of the air access port valve means where air may gain access thereto through the non return valve;

(4) Water may be completely drained from the float leaving air in the float and in the connection conduit and associated upper chamber of the valve body to thereby provide an air lock with the water seal still being present in the base chamber. In this position the float may be located on or adjacent the base wall of the tank to thereby allow water to enter the tank through the tank inlet;

(5) Water may be prevented from gaining access to the float because of the air present in the float interior and this makes the float bouyant and thus float upwardly dependent upon the water level;

(6) The float may now reach a hold level located below the maximum level of water in the tank reached in step (2) and thus the water flow into the tank through the tank inlet may now be shut off;

(7) Upon actuation of the remotely controlled actuating means fluid may then fill the other of the upper chambers of the valve body and thus break the water seal by causing water to flow out of the base chamber of the valve body through the outlet pipe;

(8) With the breaking of the water seal air may then flow from the float interior through the connectin conduit and out through the outlet pipe of the valve body thus breaking the air lock in the float interior and thereby allowing water to flow into the float interior; and (9) Water may then reach a maximum level in the tank to thereby be drained therefrom by siphon action causing step (3) etc to be repeated.

BRIEF DESCRIPTION OF THE DRAWING

Reference may now be made to a preferred embodiment of the invention as shown in the attached drawings wherein.

DETAILED DESCRIPTION

Figure 1:
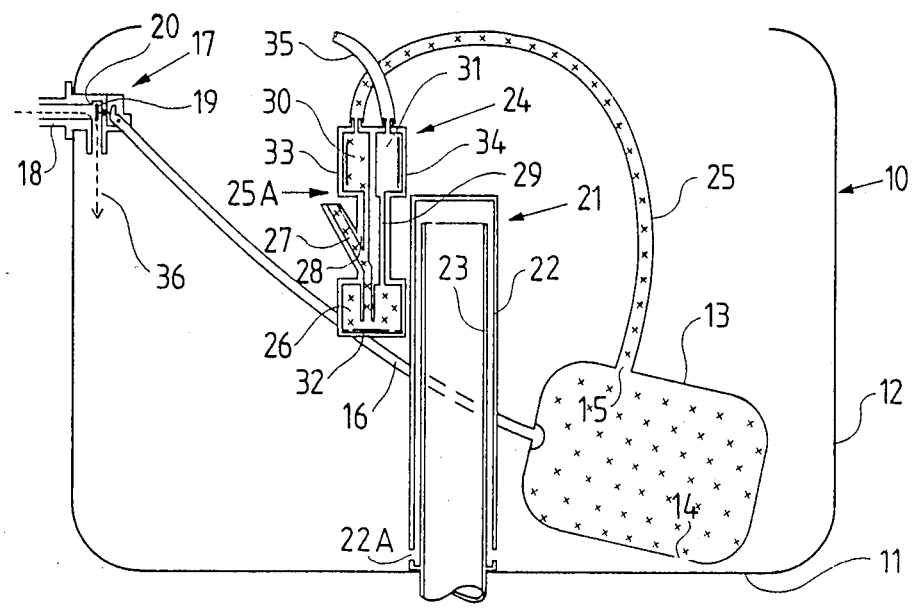
FIG. 1 is a view of an automatic flushing system constructed in accordance with the invention and illustrating step (1) above.

In the drawings there is shown a cistern tank 10 having a base wall 11 and side wall 12. There is also shown a hollow float 13 having water access port 14 and air access port 15. Also shown is float arm 16 which is associated with valve 17 of water inlet pipe 18 of tank 10. Float arm 16 is attached to movable valve member 19 of valve 17 which is shown in an open position clear of valve seat or valve orifice 20 and allowing water to flow into tank 10 from inlet pipe 18. Also shown is siphon outlet 21 having outer tube 22 with base apertures 22A and inner tube 23 which extends through base wall 11 of tank 10 as shown.

Also shown is valve 24 for air access port 15 of float 13 and interconnecting tubular conduit 25. Valve 24 comprises valve body 25A, base chamber 26, outwardly extending outlet pipe 27 and internal passages 28 and 29 leading to upper chambers 30 and 31 respectively. Also shown are non return valves 32, 33 and 34 as well as tubular conduit 35 which communicates with a remote controlled actuating means (not shown) which in the illustrated embodiment may be a pneumatic ram assembly attached to a door or a pressure mat which when under pressure may pump or force air into conduit 35 when required as hereinafter discussed. All of float 13, conduit 25, base chamber 26, pipe 27 and chamber 30 may be filled with air as shown by the crosses.

Figure 2:
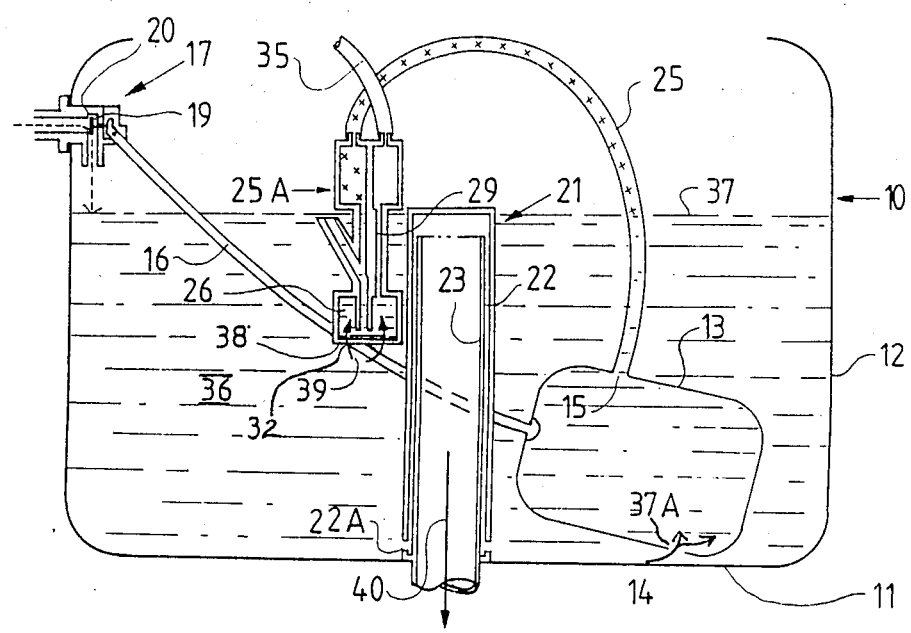
FIG. 2 illustrates step (2)

In FIG. 1 there is shown the situation wherein the tank 10 may be primed or initially charged with water through inlet pipe 18 when valve 17 is open. Water 36 is free to fill tank 10 in this situation until a maximum level 37 is reached as shown in FIG. 2. Water 36 may then have filled float 13 as shown by arrows 37A and conduit 25 up to level 37 as well as valve 24 up to level 37. Water may enter valve 24 through inlets 38 as shown by arrows 39. At this stage water may start to drain through siphon outlet 21 as shown by arrow 40. Valve 17 is still in the open position as indicated. The crosses show that air still occupies conduit 25 above level 37 and chamber 30. However water has displaced the air from float 13 and that portion of conduit 25 below level 37. Water has also displaced air from chamber 26 and hollow passages 28 and 29. Thus FIG. 2 shows the situation of the system flushing after the initial priming fill.

Figure 3:
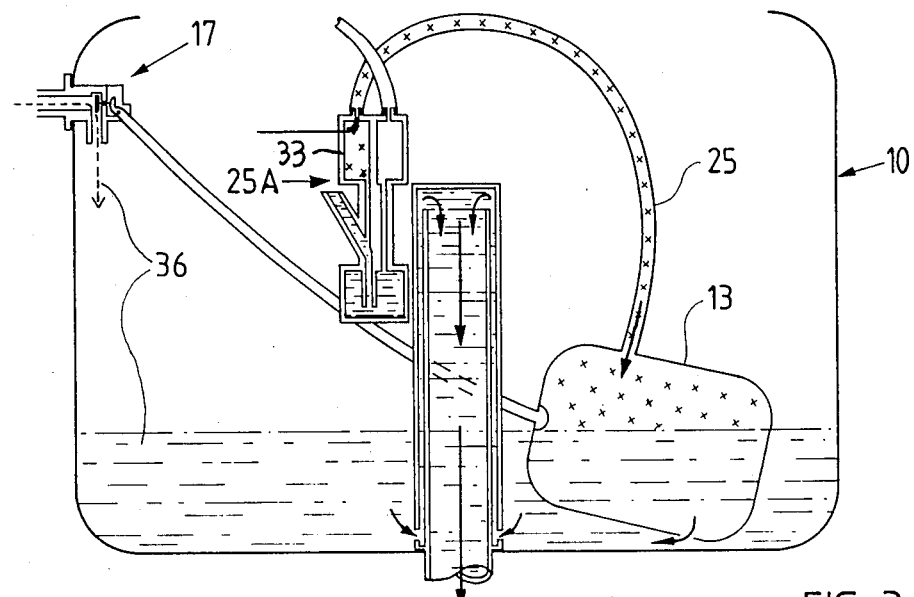
FIG. 3 illustrates step (3)

FIG. 3 shows the flushing in progress and draining through pipe 23 and the level of water 36. In this situation water is draining out of float 13 as shown and being displaced by air from conduit 25 and which is entering chamber 30 via non return valve 33 as shown. Water still occupies base chamber 26 and passages 28 and 29 of valve 24 as shown.

Figure 4:
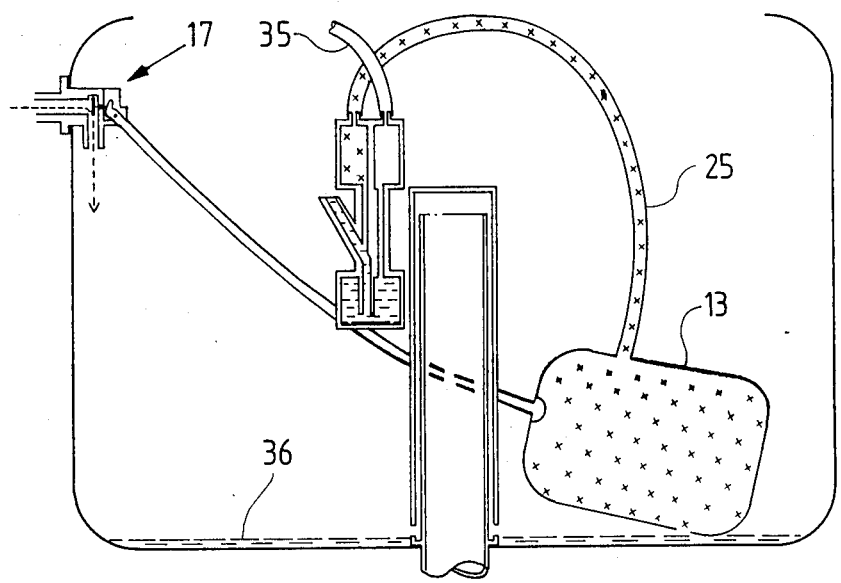
FIG. 4 illustrates step (4)

In FIG. 4 the situation is shown when the flush cycle has been completed. Valve 17 is still open and the water level in tank 10 is as indicated. Float 13, conduit 25 and chamber 30 are still filled with air and the water seal in chamber 26 and passages 28, 29 and pipe 27 is still present.

Figure 5:
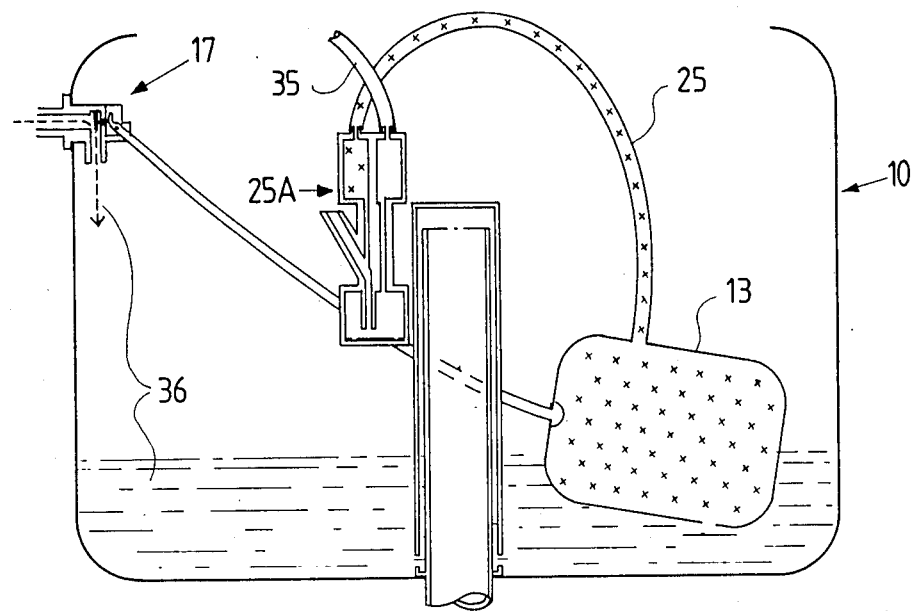
FIG. 5 illustrates step (5)

In FIG. 5 because float 13 is still filled with air and is now buoyant it floats on the top of the water level as it rises because valve 17 is still open. Both the water seal and air lock as shown are still present as in FIG. 4.

Figure 6:
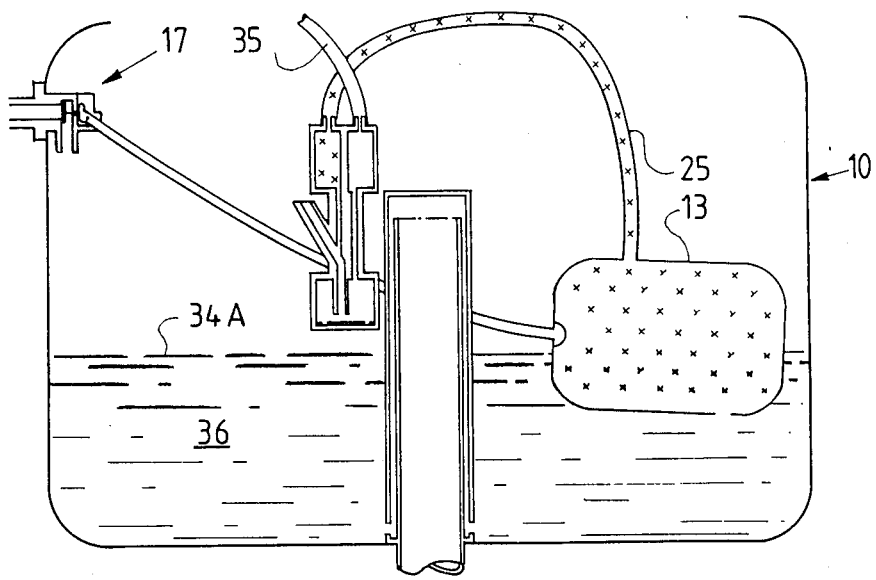
FIG. 6 illustrates step (6)

In FIG. 6 the water level will rise until it reaches a hold level designated by reference numeral 34A. This means the float 13 will not rise any further in tank 10 as valve 17 is now shut off as shown wherein valve member 19 bears against valve seat 20. Both the air lock and water seal are still present as in FIGS. 4-5.

Figure 7:
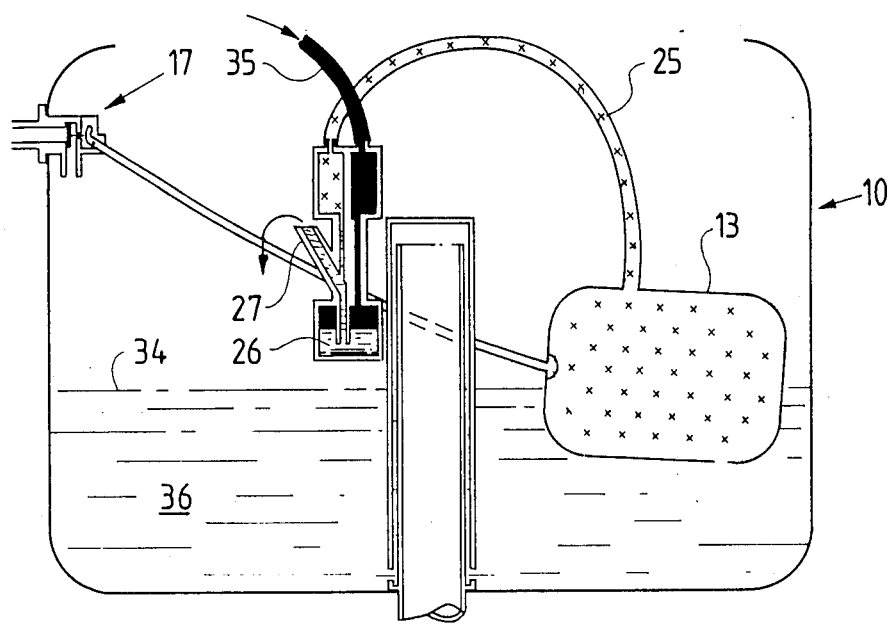
FIG. 7 illustrates step (7)

In FIG. 7 the remotely controlled actuating means is now actuated and air as shown by the dark shading enters chamber 31 through conduit 35 and hence through passage 29 and into base chamber 26 thus forcing water out through outlet pipe 27 as shown. The air lock is still present as shown and float 13 is still at hold level 34 although the water seal is being drained or exhausted as shown.

Figure 8:
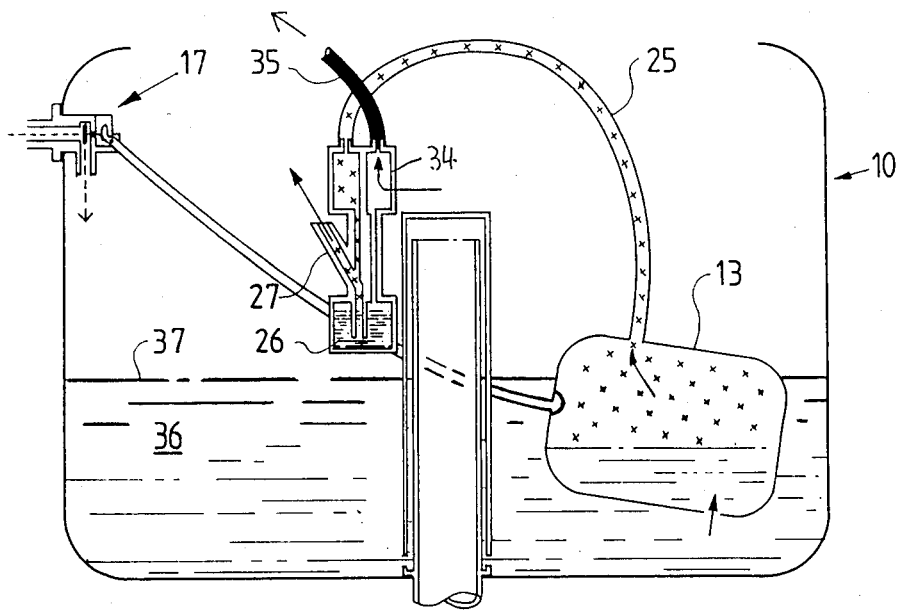
FIG. 8 illustrates step (8)

In FIG. 8 the remotely controlled actuating means is inactivated and air instead of entering chamber 31 is now exhausted therefrom, e.g., by the return stroke of a piston in a pneumatic ram assembly. This means that air now enters chamber 31 through non return valve 34 as shown. The air lock is now broken as air now exits valve body 25A through outlet pipe 27. This enables water to enter float 13 as shown and the water level in tank 10 will continue to rise as valve 17 is now opened as previously described. The float 13 as water enters the interior thereof will sink below the water level as shown.

Figure 9:
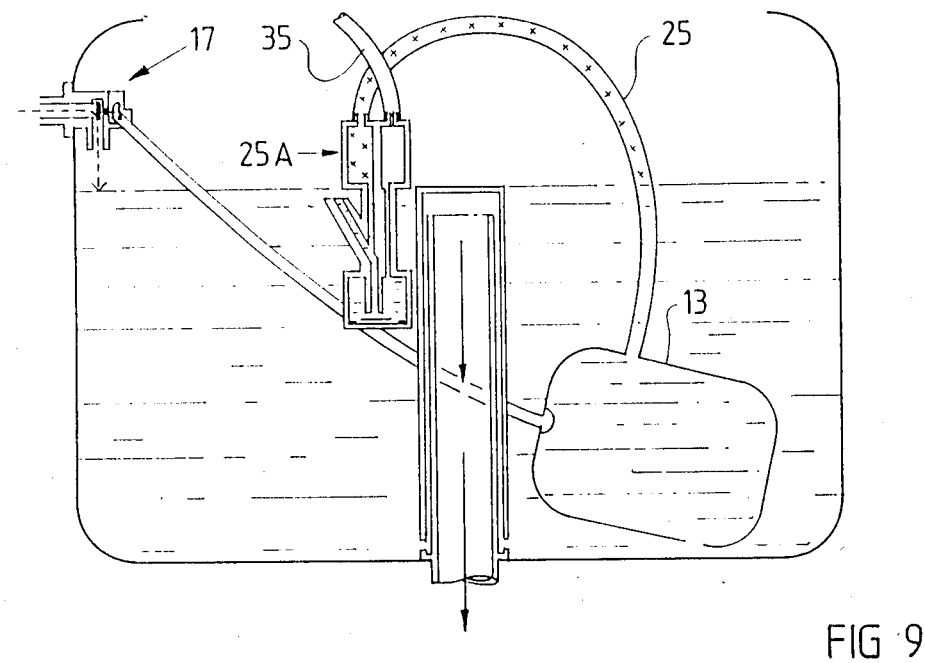
FIG. 9 illustrates step (9).

In FIG. 9 the water will rise to maximum level 37 and the float 13 will continue to sink as it is now filled with water as shown. As level 37 is attained the flushing cycle will now commence and the sequence of operations as discussed in FIGS. 3-8 will re-occur.

It will be appreciated that the non return valves 32, 33 and 34 as referred to above may be of any convenient type and thus may be check valves, ball valves, flap valves or diaphragm valves. The latter are preferred.

It will also be appreciated from the abovementioned preferred embodiment that it is desirable in accordance with the invention to modify an existing float or provide a new float so that after the flush cycle it will reach an intermediate or hold level. It is then desirable to use an external valve of the type described above to break an air lock within the float so that it will then sink to thus open the cistern inlet valve and complete the flush cycle. The buoyancy of the float may then be re-established as described above.

It will also be appreciated that the invention will also include within its scope the components of the automatic flushing system as described as well as a method of operation therefor.

It will also be appreciated that the term "air" as used herein may include any other gas or gaseous fluid.

The invention also includes within its scope a method of operation of the above described automatic flushing system including the steps of:

(1) filling the tank to maximum level with water, thereby filling the float with water and creating a water seal associated with the air access port valve means;

(2) draining water from the float by siphon action allowing air to gain access to the float interior above the water level to thereby provide an air lock with the water seal still being present and thus preventing water from gaining access to the float so as to make the float buoyant and thus movable dependent on the water level;

(3) causing the float to reach a hold level located below the maximum level of water reached in step (2); and thus preventing water flow through the tank inlet valve means;

(4) breaking the water seal thus allowing air to escape from the float interior to allow water to gain access thereto and thereby allowing water to reach the maximum level in the tank.

We claim:

1. An automatic flushing system for use with a toilet or urinal, comprising:
    a tank having an inlet and a siphon outlet;
    a hollow float disposed for substantially vertical motion in said tank, said float having a water access port and an air access port;
    water flow control means including a valve mounted to said tank at said inlet for controlling the flow of water into said tank through said inlet;
    first actuator means operatively connected to said valve and said float for closing said valve upon an attainment of a predetermined uppermost vertical position by said float and for opening said valve upon a descending of said float below said uppermost vertical position, said uppermost vertical position corresponding to an intermediate level of water in said tank;
    air flow control means mounted at least indirectly to said tank and communicating with said float at said air access port for controlling the flow of air into and out of said float and for concomitantly controlling the flow of water out of and into said float, said air flow control means including sealing means communicating with said tank for establishing a water block to the passage of air from said float through said air access port upon the attainment of a predetermined high level by water in said tank, said high level being above said intermediate level, said siphon outlet being adapted to begin siphoning water from said tank upon the attainment of a predetermined uppermost level of water in said tank, said uppermost level being at least as high as said high level; and
    second actuator means operatively connected to said air flow control means for breaking said water block to initiate a flushing operation wherein water enters said float through said water access port, said float descends in said tank and thereby opens said valve, said water rises in said tank from said intermediate level to said high level and said uppermost level, whereby said blocking means establishes said water block and water begins drains from said tank via said siphon outlet.

2. An automatic flushing system as set forth in claim 1 wherein said second actuator means includes means for directing a flow of air through said sealing means to evacuate water collected therein.

3. An automatic flushing system as set forth in claim 1 wherein said siphon outlet includes a vertically oriented outer pipe having a closed upper end, said pipe being provided at a point spaced from said upper end with an aperture.

4. An automatic flushing system as set forth in claim 3 wherein said siphon outlet further includes a vertically oriented inner pipe disposed inside said outer pipe, said inner pipe communicating with said outer pipe at a point vertically spaced from said aperture, said inner pipe extending through a base wall of said tank.

5. An automatic flushing system as set forth in claim 1 wherein said first actuator means includes an elongate lever arm attached at one end to said float and at an opposite end to said valve.

6. An automatic flushing system as set forth in claim 1 wherein said float has a bottom wall and a top wall, said water access port being located in said bottom wall, said air access port being located in said top wall.

7. An automatic flushing system as set forth in claim 1 wherein said second actuator means is remotely controlled.

8. An automatic flushing system as set forth in claim 1 wherein said air flow control means comprises a valve body communicating with said float via a connection conduit.

9. An automatic flushing system as set forth in claim 8 wherein said sealing means includes at least one chamber in said valve body, said chamber being filled with water upon the attainment of said high level by water in said tank during a flushing operation, said chamber being evacuated of water at an onset of a flushing operation by said second actuator means.

10. An automatic flushing system as set forth in claim 9 wherein said chamber is provided with a one way valve, said sealing means including a pair of additional chambers disposed in said valve body higher than said one chamber, each of said additional chambers being provided with a respective one way valve, one of said additional chambers communicating with said connection conduit and the other of said additional chambers communicating with said second actuator means, said sealing means further including a pipe stub on said valve body, said pipe stub communicating at one end with said tank and at an opposite end with said one chamber.

11. An automatic flushing system for use with a toilet or urinal, comprising:
   a tank having an inlet and a siphon outlet;
   a hollow float disposed for substantially vertical motion in said tank, said float having a water access port and an air access port;
   water flow control means including a valve mounted to said tank at said inlet for controlling the flow of water into said tank through said inlet and thereby at least partially determining the amount of water in said tank;
   actuator means operatively connected to said valve and said float for operating said valve in accordance with the vertical position of said float; and
   air flow control means responsive to a predetermined level of water in said tank and communicating with said float at said air access port for controlling the flow of air into and out of said float and for concomitantly controlling the flow of water out of and into said float in response to said predetermined level of water in said tank, said air flow control means being mounted at least indirectly to said tank.

12. An automatic flushing system as set forth in claim 11 wherein said air flow control means includes sealing means communicating with said tank for establishing a water block to the passage of air from said float through said air access port.

13. An automatic flushing system as set forth in claim 12, further comprising additional actuator means operatively connected to said air flow control means for breaking said water block to initiate a flushing operation.

14. An automatic flushing system as set forth in claim 13 wherein said air flow control means includes means for establishing said water block upon the attainment of a predetermined high level by water in said tank, said high level being above said intermediate level, said siphon outlet being adapted to begin siphoning water from said tank upon the attainment of a predetermined uppermost level of water in said tank, said uppermost level being at least as high as said high level.

15. An automatic flushing system as set forth in claim 14 wherein the actuator means for operating said valve includes a lever arm connected at one end to said float and at an opposite end to said valve for closing said valve upon an attainment of a predetermined uppermost vertical position by said float and for opening said valve upon a descending of said float below said uppermost vertical position, said uppermost vertical position corresponding to an intermediate level of water in said tank.

16. A method for automatically operating a system for flushing a toilet or urinal, said system including a hollow float disposed for substantially vertical motion in a waterholding tank, said tank being provided with an inlet and a siphon outlet, comprising the steps of:
   opening at a start of a flushing operation an air flow control valve to enable a passage of air from the float and a concomitant passage of water into said float from said tank to cause a descending of said float from an uppermost vertical position corresponding to an intermediate level of water in said tank;
   operating a water flow control valve in accordance with the vertical position of said float in said tank to cause a flow of water into said tank to raise the water level from said intermediate level to a high level and an uppermost level, said uppermost level being at least as high as said high level;
   closing said air flow control valve upon the attainment of said high level by the water in said tank;
   draining water from said tank via said siphon outlet upon an attainment of said uppermost level by the water in said tank;
   removing water from said float prior to a termination of said step of draining;
   continuing to operate said water flow control valve to admit water into said tank during and after said step of draining to raise the level of water in said tank to said intermediate level;
   lifting said float on a surface of water rising in said tank; and
   closing said water control valve upon an attainment of said uppermost vertical position by said float.

17. A method as set forth in claim 16 wherein said step of opening said air flow control valve comprises the step of blowing out a water seal, said step of closing said air flow control valve comprising the step of establishing said water seal to prevent a flow of air from said float and to concomitantly prevent a flow of water into said float from said tank.

* * * * *

UNITED STATES PATENT AND TRADEMARK OFFICE
CERTIFICATE OF CORRECTION

PATENT NO. : 4,631,760
DATED : December 30, 1986
INVENTOR(S) : Leishman et al.

It is certified that error appears in the above-identified patent and that said Letters Patent is hereby corrected as shown below:

Column 1, line 11, change "tray like" to --tray-like--; line 23, insert --and-- after "spaces".
Column 2, line 26, change "box like" to --box-like--; line 33, change "however is" to --is, however,--; line 34, change "control" to --controls--; line 35, change "allow" to --allows--; line 42, insert --,-- after "form" and "however"; line 47, change "of" to --or--; line 54, change "non return" to --non-return--; line 57, change "non return" to --non-return--.
Column 3, line 11, insert -- - -- (hyphen) after "non"; line 35, change "connectin" to --connection--.
Column 4, line 41, delete "which"; line 42, change "non return" to --non-return--.
Column 5, line 5, change "non return" to --non-return--; line 19, change "non return" to --non-return--.
Claim 1, line 42, change "begins drains" to --begin to drain--.
Claim 10, line 2, change "one way" to --one-way--; line 6, change "one way" to --one-way--.

Signed and Sealed this

Seventh Day of April, 1987

Attest:

DONALD J. QUIGG

Attesting Officer

Commissioner of Patents and Trademarks